United States Patent
Blouet et al.

(10) Patent No.: US 11,343,632 B2
(45) Date of Patent: May 24, 2022

(54) METHOD AND SYSTEM FOR BROADCASTING A MULTICHANNEL AUDIO STREAM TO TERMINALS OF SPECTATORS ATTENDING A SPORTS EVENT

(71) Applicant: INSTITUT MINES TELECOM, Palaiseau (FR)

(72) Inventors: Raphael Blouet, Bordeaux (FR); Slim Essid, Arcueil (FR)

(73) Assignee: INSTITUT MINES TELECOM, Palaiseau (FR)

( * ) Notice: Subject to any disclaimer, the term of this patent is extended or adjusted under 35 U.S.C. 154(b) by 0 days.

(21) Appl. No.: 17/036,215

(22) Filed: Sep. 29, 2020

(65) Prior Publication Data
US 2021/0014627 A1 Jan. 14, 2021

Related U.S. Application Data

(63) Continuation of application No. PCT/FR2019/050731, filed on Mar. 28, 2019.

(51) Int. Cl.
| | | |
|---|---|---|
| *H04S 7/00* | (2006.01) | |
| *G06F 3/16* | (2006.01) | |
| *G10L 21/0272* | (2013.01) | |
| *H04R 3/00* | (2006.01) | |
| *H04N 21/218* | (2011.01) | |
| *H04N 21/2187* | (2011.01) | |
| *H04N 21/233* | (2011.01) | |
| *H04N 21/235* | (2011.01) | |
| *H04N 21/2368* | (2011.01) | |
| *H04N 21/439* | (2011.01) | |
| *H04N 21/454* | (2011.01) | |

(52) U.S. Cl.
CPC ............. *H04S 7/302* (2013.01); *H04S 7/305* (2013.01); *H04S 2400/11* (2013.01); *H04S 2400/15* (2013.01); *H04S 2420/01* (2013.01)

(58) Field of Classification Search
None
See application file for complete search history.

(56) References Cited

U.S. PATENT DOCUMENTS 5,714,997 A    2/1998 Anderson
9,483,228 B2 * 11/2016 Saungsomboon ........ H04S 7/30
(Continued)

FOREIGN PATENT DOCUMENTS

WO    WO 2007/115392 A1    10/2007
WO    WO 2017/182714 A1    10/2017

OTHER PUBLICATIONS

International Search Report and Written Opinion dated Jul. 2, 2019 for International Application No. PCT/FR2019/050731, 13 pages.

*Primary Examiner* — Qin Zhu
(74) *Attorney, Agent, or Firm* — Frost Brown Todd LLC

(57) ABSTRACT

The invention relates to a method for broadcasting a spatialized audio stream to terminals of spectators attending a sports event. The method comprises the acquisition of a plurality of audio streams constituting a soundscape. The soundscape is analyzed by a server in order for the sound spatialization of the audio streams and of the playback thereof on terminals, depending both on the localization of the audio flows and also the position of the spectators.

9 Claims, 3 Drawing Sheets

(56) References Cited

U.S. PATENT DOCUMENTS

| | | | |
|---|---|---|---|
| 9,832,587 B1 | 11/2017 | Park et al. | |
| 10,102,430 B2* | 10/2018 | Vunic | G06K 9/00711 |
| 10,511,927 B2* | 12/2019 | Kitazawa | H04R 5/02 |
| 10,911,884 B2* | 2/2021 | Wang | H04N 5/23238 |
| 10,969,666 B1* | 4/2021 | Haseltine | G03B 21/562 |
| 2007/0083365 A1* | 4/2007 | Shmunk | G10L 21/0272 |
| | | | 704/232 |
| 2009/0094375 A1* | 4/2009 | Lection | G06F 15/16 |
| | | | 709/231 |
| 2011/0081024 A1* | 4/2011 | Soulodre | H04S 7/30 |
| | | | 381/17 |
| 2014/0355769 A1 | 12/2014 | Peters et al. | |
| 2015/0195641 A1 | 7/2015 | Di Censo et al. | |
| 2015/0213316 A1* | 7/2015 | Vunic | G06K 9/00765 |
| | | | 386/278 |
| 2015/0373474 A1 | 12/2015 | Kraft et al. | |
| 2016/0064005 A1* | 3/2016 | Peters | H04H 60/07 |
| | | | 381/23 |

* cited by examiner

METHOD AND SYSTEM FOR BROADCASTING A MULTICHANNEL AUDIO STREAM TO TERMINALS OF SPECTATORS ATTENDING A SPORTS EVENT

PRIORITY

The present application is a continuation of International Application PCT/FR2019/050731, filed Mar. 28, 2019, which claims the benefit of and priority to FR Patent Application No. 18 52774 filed on Mar. 29, 2018, the entire disclosures of which are incorporated herein by reference.

FIELD OF THE INVENTION

The invention relates to broadcast methods and systems with which to improve sound perception of spectators attending a sports event.

More precisely, the invention bears on broadcast methods and systems using augmented sound reality, and allowing a spectator attending a sports event to perceive personalized audio streams coming from the event.

BACKGROUND OF THE INVENTION

The document WO 2007/115392 describes a system allowing spectators to attend remotely several sporting events taking place simultaneously. More precisely, the spectators are provided with a mobile electronic terminal on which they receive several multimedia streams each corresponding to one of the sporting events retransmitted live. Typically, the multimedia streams can be video streams or audio streams. The spectator can choose what multimedia streams they want to access. However such a system does not allow full immersion of the spectator.

The present invention seeks to improve the situation.

BRIEF SUMMARY

For this purpose, it proposes a method and system for broadcasting a multichannel audio stream to terminals of spectators attending a sports event, the method comprising, in a servers
  acquisition of a plurality of raw audio streams constituting a soundscape comprising one or more sound sources by means of a plurality of audio sensors distributed over a space hosting the sports event;
  analysis of the soundscape comprising:
    isolation of each sound source of the soundscape and assignment of a single-channel audio stream, specific to each sound source;
    for each single-channel audio stream, a spatial localization as a function of a position of the sound source associated with a single-channel audio stream, in the space hosting the sporting event;
    generation of a description table of the single-channel audio streams, where the description table comprises an identifier of each single-channel audio stream and, in association with each single-channel audio stream identifier, at least one localization data;
  transmission of the description table with a multichannel audio stream to one or more terminals, where the multichannel audio stream aggregates the single-channel audio streams, and in a terminal:
    use of the received description table and of the multichannel audio stream for applying a sound spatialization filtering of the single-channel audio stream according to the respective locations of each single-channel audio stream on the one hand and on the position of the spectator in said space hosting the sporting event on the other hand, in order to playback spatialized sound of at least one part of the single-channel audio streams on the terminal.

Because of these dispositions, the spectator is actually auditorily immersed in the sporting event. In fact, the specialized sound playback serves to take into account the position of the spectator so that the broadcast audio streams correspond exactly to what they're living.

According to an implementation, the analysis of the soundscape further comprises:
  for each single-channel audio stream, the classification of the sound source associated with a single-channel audio stream into one class among a plurality of classes, as a function of a type;
the table further comprising single-channel audio stream class data associated with each single-channel audio stream identifier;
and the method comprising, in the terminal:
  reading from the description table for identifying the class of each single-channel audio stream;
  application of respective gains to the single-channel audio streams for the spatialized sound playback, where the gains are chosen by a spectator with the terminal according to the class of each single-channel audio stream.

In that way, the spectator can choose what type of audio stream they want to hear. Their immersion in the sporting event is only improved because they can set aside the audio streams whose sound source does not interest them. The spectator lives a personalized experience of the sporting event.

According to an embodiment, the method comprises a determination of an orientation of the spectator relative to a chosen reference frame, where the method further comprises an application of respective gains to the spatialized single-channel audio streams, where the respective gains applied to the spatialized single-channel audio stream change as a function of the position and/or orientation of the spectator relative to the chosen reference frame.

In that way, the immersion of the spectator in the sporting event is further increased. In fact, the determination of their orientation allows it to do an "audio zoom" on the part of the space hosting the sporting event which the spectator is looking at.

According to an embodiment, the method comprises a division of the space hosting the sporting event into a plurality of sub spaces, where at least one audio sensor is provided in each subspace, where the method comprises the construction of the soundscape by a mixing of the raw streams captured by the audio sensors and where the method comprises, for the analysis of the soundscape, a determination of the positions of the sound sources relative to each of said subspaces.

In this way, this step allows spatialized sound playback with a reduced number of steps, calculations and data exchanges. In fact, it is sufficient to coarsely determine the localization of the sound sources.

According to an implementation, the isolation of sound sources is done by separation of sources.

According to an implementation, the isolation of sound sources is done by temporal-frequency masking.

According to an embodiment, the classification of the single-channel audio streams is done by learning, where the single-channel audio streams are classified by a deep neural network technique.

Thus, it is possible to implement the method in real time.

According to an implementation, the method further comprises, in the server:

for each phase of play, a determination of a type of the phase of play, among a plurality of types of phases of play;
a selection, in a library of informative audio streams, of at least one informative audio stream based on the determined type of the phase of play; and
a transmission to the terminal of the informative audio stream in order for the sound playback thereof.

Thus, it allows the spectator to be even more deeply immersed in the sporting event. This also makes it possible for the spectator to not miss crucial phases of play because the system serves to alert spectators of the phase of play in progress.

According to an embodiment, the determination of the type of phase of play and possibly the localization on the field associated with this phase of play, can initially be done by learning from images acquired by video capture of phases of play by at least one camera, where the learning is done by means of a deep neural network technique.

In this way the determination and possibly the localization of the type of phase of play can be done automatically in real time.

The present invention also targets a system for broadcasting a multichannel audio stream to terminals of spectators attending a sports event comprising:

a module for acquisition of a plurality of raw audio streams constituting a soundscape comprising one or more sound sources that comprises a plurality of audio sensors distributed in a space hosting the sporting event;
a server comprising a computerized module for analysis of the soundscape configured for:
  isolating each sound source of the soundscape and assigning a single-channel audio stream, specific to each sound source;
  for each single-channel audio stream, localizing the sound source associated with the single-channel stream in the space hosting the sporting event;
  generating description table of single-channel audio streams, where the description table comprises an identifier of each single-channel audio stream and, in association with each single-channel audio stream identifier, at least one localization data;
  a transmission module configured for transmitting the description table with a multichannel audio stream to one or more terminals, where the multichannel audio stream aggregates the single-channel audio streams,
a terminal configured for:
  using the received description table and the multichannel audio stream for applying a sound spatialization filtering of the single-channel audio stream according to the respective localizations of each single-channel audio stream on the one hand and on the position of the spectator in said space hosting the sporting event on the other hand, in order to playback spatialized sound of at least one part of the single-channel audio streams on the terminal.

According to an implementation, an orientation sensor is able to determine the orientation of the spectator in space, where the orientation sensor is chosen among an inertial navigation unit and/or an accelerometer.

BRIEF DESCRIPTION OF THE DRAWINGS

Other advantages and characteristics of the invention will emerge upon reading the following detailed description of embodiments of the invention, and examining the attached drawings in which.

DETAILED DESCRIPTION

"Sporting event" is understood to mean any sporting event bringing together a large number of spectators in a single area for attending a sports performance. For example, the system can be used in the context of a soccer, basketball, baseball, rugby, hockey, tennis game, etc. This list is not limiting.

Figure 1:
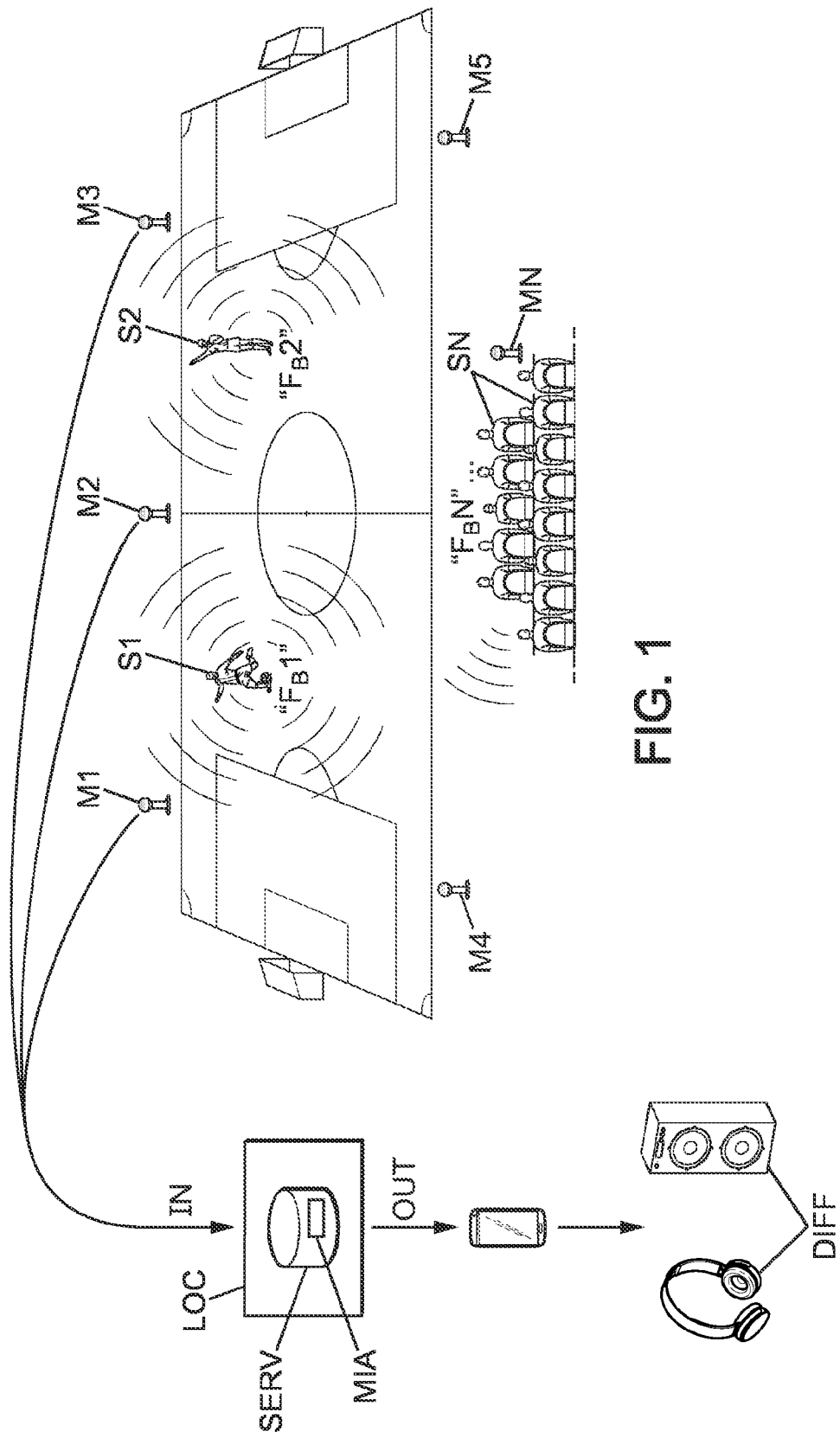
FIG. 1 is a schematic view showing the operation of the system for broadcast of a multichannel audio stream according to the invention.
Figure 3:
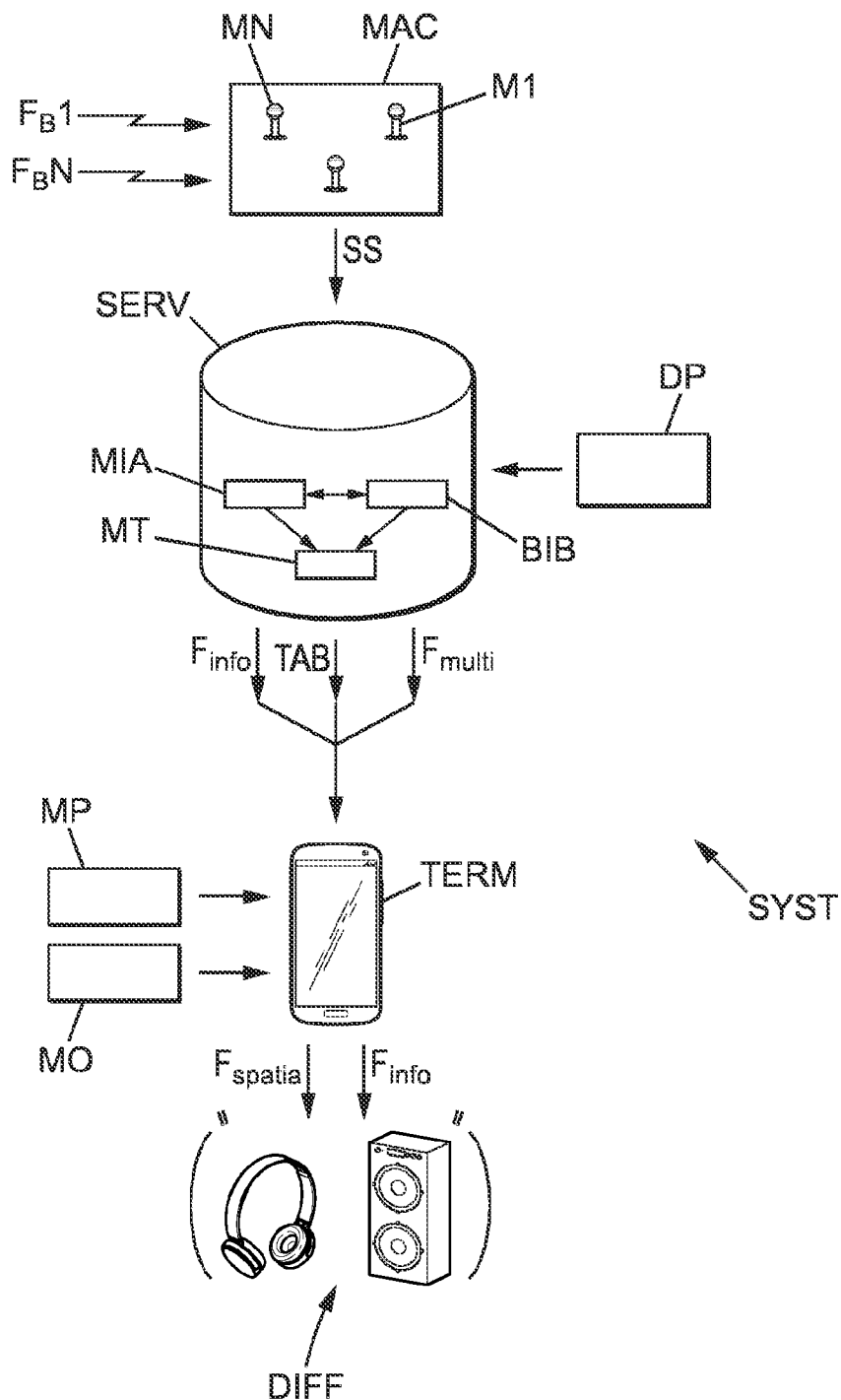
FIG. 3 schematically shows the system according to the invention.

As shown in FIGS. 1 and 3, the system SYST comprises an acquisition module MAC. The acquisition module MAC comprises a plurality of audio sensors M1-MN, for example of microphones. The audio sensors M1-MN are distributed in the space hosting the sporting event. The appearance of the space hosting the sporting event can vary greatly according to the type of sporting event. In particular, the space hosting the sporting event can be a stadium with stands, a racing circuit, etc.

For each type of space hosting the sporting event (or "space" in the remainder of the description) the audio sensors M1-MN are distributed such that each raw audio stream $F_B1$-$F_BN$ coming from the sporting event is captured. The audio sensors M1-MN can then be distributed homogeneously around the space hosting the sporting event.

"Raw audio streams" is understood to mean the audio streams which are recorded by the audio sensors M1-MN and which are not yet processed. The raw audio streams can comprise the noise of the crowd attending the sporting event, noises coming from the play of the players, for example kicking a ball, a grunt, etc. The raw audio streams can also include words exchanged between the players. The raw audio streams can also include words exchanged between the spectators. The raw audio streams form a soundscape comprising one or more sound sources.

In the example from FIG. 1, raw audio streams $F_B1$-$F_BN$ and sound sources S1-S1 are shown. The raw audio stream $F_B1$, associated with the sound source S1, corresponds for example to a player kicking a ball. The raw audio stream $F_B2$ associated with the sound source S2, corresponds to a whistle and the audio stream $F_BN$, associated with sound source SN, corresponds to words exchanged between spectators. The audio streams $F_B1$-$F_BN$ are captured by the audio sensors M1-MN of the MAC acquisition module.

The audio streams $F_B1$-$F_BN$ are broadcast in the space. Thus, each audio stream $F_B1$-$F_BN$ is captured more or less intensely by each audio sensor M1-MZ. For example, the audio sensor M1 mainly captures the audio stream $F_B1$, but it also captures the audio stream $F_B2$. Similarly, the audio sensor M5 very precisely captures the raw audio stream $F_BN$, a little less the audio stream $F_B1$ and even less the audio stream $F_B2$. The soundscape SS is made up by mixing all the raw audio streams $F_B1$, $F_B2$ and $F_BN$. The soundscape SS comprises several sound sources S1-SN.

The system SYST may comprise at least two networks of audio sensors M1-MN. The first network of audio sensors for example serves to capture the background noise of the sporting event, typically the noise of the crowd attending the sporting event. The first network of audio sensors can also serve to capture words exchanged between the spectators. Thus, the audio sensors from the first network are preferably arranged near the spectators, and preferably directly on the spectators.

The second network of audio sensors M1-MN can also serve to capture the background noise from the sporting event or the noise of the crowd. The second network can also capture raw audio streams associated with the sporting event. This may comprise the noises coming from the game, such as kicking a ball, or even the words exchanged between players.

It is possible to define at least three types of sound sources. The first type corresponds to the ambience of the sporting event. The first type comprises in particular the noise of the crowd attending the sporting event. The second type corresponds to the events of the sporting event. For example, it comprises kicking a ball, whistles, etc. The third type corresponds to the words exchanged between the spectators at the sporting event.

The plurality of raw audio streams captured by each of the audio sensors M1-MN is sent to an analysis area LOC. Transmission is shown by the arrow "IN," in FIG. 1. The analysis area comprises at least one SERV server in which filtering of the raw audio streams $F_B1$-$F_BN$ is applied. In particular, a filtering by separation of sources is done. Through the separation of sources, the various sound events of play can be separated from the soundscape recorded by the audio sensors. The filtered streams are sent to a terminal TERM in order for a spatialized playback on the terminal TERM of at least one audio streams. The terminal TERM is for example a smart phone, electronic tablet or computer type mobile terminal.

Broadcast devices DIFF are also provided in order to broadcast the spatialized audio streams. The broadcast devices DIFF may be personal speakers or audio headsets that each spectator has at their disposition.

The system SYST according to the invention serves in particular for a personalized sound playback. For example, the sound playback of the sounds relating to the sporting event is done depending on the location of each sound source S1-SN as well as the position of the spectator using the terminal TERM in the space hosting the sporting event. The position of the spectator can be determined by a positioning module MP, able to localize the spectator by Global Positioning System (GPS), by triangulation or by Near Field Communication (NFC). The spectator will hear more clearly an audio stream whose associated sound source is closer to them. Returning to the example from FIG. 1, a spectator located to the left of the field will hear more pronouncedly the audio stream $F_B1$ associated with the source S1 than the audio stream F2 associated with the sound source S2.

In a simple implementation, the speaker has the possibility of entering playback preferences for the soundscape via the terminal TERM. For example, the spectator may choose to hear audio streams associated with a certain type of sound source. For example, the spectator may choose to hear only the words exchanged between the spectators, or only the referee's whistles. The spectator may also choose to hear more or less loudly all the audio streams depending on the type of audio source with which they are associated.

According to another sample implementation, the spectator hears some audio streams more loudly depending on their orientation in the space hosting the sporting event. For example, the system comprises an orientation module MO comprising an orientation sensor for determining what direction the spectator is looking in. The spectator may then be equipped with an accessory, for example a headset or a tag, supporting the orientation sensor. The orientation sensor may be an accelerometer or an inertial navigation unit. It is then possible to determine what sound source S1-SN the spectator is turned towards in order to amplify the broadcast volume of the audio streams associated with this sound source. The experience of the spectator is improved that way because it makes it possible to be completely immersed in the sporting event they are attending.

Figure 2:
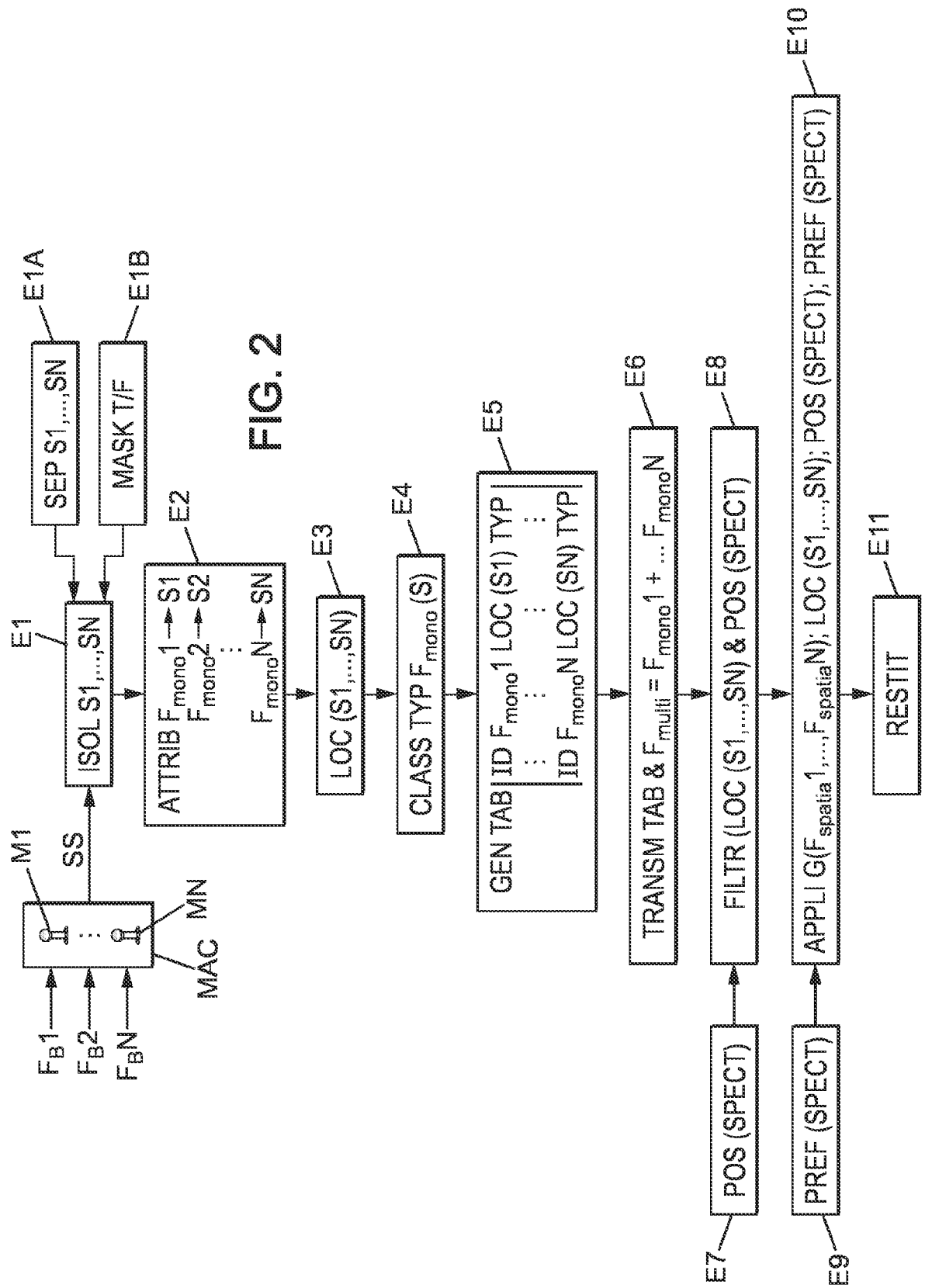
FIG. 2 is a sequence diagram of the main steps of the method for broadcasting a multichannel audio stream to terminals of spectators attending an event according to a sample implementation according to the invention.

FIG. 2 shows more precisely the principal steps of the method implemented by the system SYST.

The acquisition system MAC captures all the raw audio streams $F_B1$-$F_BN$ by means of audio sensors M1-MN. The raw audio streams $F_B1$-$F_BN$ form a soundscape SS comprising at least one sound source S1-SN.

The steps E1 to E5 are done by the server SERV. The server SERV comprises a computerized analysis module MIA with which to isolate each sound source S1-SN from the soundscape SS. The soundscape SS is sent to the computerized analysis module MIA. In step E1, the computerized analysis module MIA isolates each sound source S1-SN from the soundscape SS. The isolation of the sound sources S1-SN can be done by a method of separation of sources by beamforming, such as illustrated in step E1A. As a variant, the step of isolation of the sound sources S1-SN is done by temporal-frequency masking, such as illustrated in step E1B. The temporal-frequency masking serves in particular to separate sources when two events happen simultaneously in a single spatial zone.

Since the step E1 served to isolate each sound source S1-SN, a specific single-channel audio stream $F_{mono}1$-$F_{mono}N$ is may be assigned to each sound source S1-SN in step E2.

In each step E3, each sound source S1-SN is located in the space hosting the sports event. Thus, each single-channel audio stream $F_{mono}1$-$F_{mono}N$ may be localized as a function of the localization of the sound source S1-SN which belongs thereto. Notably, the space hosting the sporting event can be divided into a plurality of subspaces. For example, the space hosting the sporting event can be divided into a grid, although the space may be divided according to another configuration. For example, each subspace may correspond to a specific area of play, for example the center of the field, each goal box, the penalty areas, etc. At least one audio sensor M1-MN is provided per subspace. The localization of the sound sources S1-SN is done relative to each subspace. More precisely, the localization of each sound source S1-SN corresponds to the subspace in which it is located. The localization of each single-channel audio stream $F_{mono}1$-$F_{mono}N$ and that of the sound source S1-SN which is associated therewith.

The computerized analysis module MIA generates a description table TAB in step E5. Each single-channel audio stream $F_{mono}1$-$F_{mono}N$ is defined by an identifier ID. Each identifier ID is associated with localization data LOC of the single-channel audio stream $F_{mono}1$-$F_{mono}N$ determined in step E3.

According to an implementation variant, the method according to the invention further comprises a preliminary step E4 of classification of the single-channel audio streams $F_{mono}1$-$F_{mono}N$. This classification is done as a function of the type of the sound source S1-SN associated with the single-channel audio stream $F_{mono}1$-$F_{mono}N$. As described above, there are at least three types of sound sources S1-SN. The first type corresponds to the ambience of the sporting event and notably includes the noise of the crowd. The second type corresponds to the events of the sporting event and notably includes the players' kicks and the referee's whistles. The third type corresponds to the words exchanged between spectators. Each type of sound source can be associated with at least one class. Several classes can correspond to a single type of sound source. For example, a first class corresponding to kicking a ball and a second class comprising the referee's whistles can be associated with the second type of sound source.

According to an embodiment, the classification of the single-channel audio streams $F_{mono}1$-$F_{mono}N$ may be done by means of a supervised method of separation of sources. The classification is done by learning, by means of a deep neural network technique. This has the advantage of allowing the real-time use of the method. Effectively, because of learning, the type of sound source with which the audio streams are associated can be recognized upon transmission to the server SERV of the audio streams captured by the acquisition module MAC.

According to this implementation variant, a class TYP is further assigned to each identifier ID of single-channel audio stream $F_{mono}1$-$F_{mono}N$ included in the description table TAB.

The description table TAB is next sent to the terminal TERM in step E6 by a transmission module MT. The transmission also comprises a multichannel audio stream $F_{multi}$ comprising the set of single-channel audio streams.

According to an implementation variant, the system SYST does not comprise a transmission module MT. The single-channel audio streams $F_{mono}1$-$F_{mono}N$ are included in a library BIB and are locally synthesized in order for the spatialized sound playback thereof.

The steps E1 to E6 are done in real time by the server SERV.

The steps E7 to E11 are done by the terminal TERM. The terminal TERM received the description table TAB and also the multichannel audio stream $F_{multi}$ aggregating the set of single-channel audio streams $F_{mono}1$-$F_{mono}N$.

The terminal TERM may use the description table for applying at least one sound specialization filtering. In step E7, the terminal TERM thus receives positioning data for the spectator using the terminal TERM. The positioning data are obtained by the positioning module MP and/or by the orientation module MO. The positioning data comprises at least the geographic position of the spectator in the frame of reference of the space hosting the sporting event.

The positioning data can further comprise data relative to the orientation of the spectator relative to a reference frame fixed in space, for example the center of the playing field. The orientation of the spectator corresponds to the subspace towards which they are turned. The use of orientation data from the spectator serves, as seen above, to make an "audio zoom" on the part of the space targeted by the spectator.

The positioning data are acquired continuously in real time by the positioning module MP.

In the step E8, the single-channel audio streams $F_{mono}1$-$F_{mono}N$ is filtered as a function of the positioning data from the spectator and the localization of the single-channel audio streams included in the description table TAB. A plurality of spatialized single-channel audio streams $F_{spatia}1$-$F_{spatia}N$ thus results.

Just the same, the spectator has the possibility of putting some audio streams before others. They therefore have the possibility of choosing whether they wish to do an audio zoom based on their spatial orientation, or which classes of audio stream to broadcast. Thus, in the step E9, the terminal TERM receives preference instructions from the spectator. The spectator may for example enter their instructions through an interface of the terminal TERM. For example, a dedicated application can be provided for allowing an exchange between the spectator and the terminal TERM.

In step E10, the terminal TERM applies respective gains to at least one part of the spatialized single-channel audio streams $F_{spatia}1$-$F_{spatia}N$.

According to the implementation variant in which the orientation of the spectator is considered, the description table TAB is read. A respective gain is applied to the spatialized single-channel audio streams $F_{spatia}1$-$F_{spatia}N$ for which the associated localizations in the description table TAB correspond to the direction in which the spectator is oriented. More precisely, a larger gain is applied to the spatialized single-channel audio streams $F_{spatia}1$-$F_{spatia}N$ for which the sound source is localized in the same subspace as the one targeted by the spectator.

Since the positioning data are acquired in real time and continuously, the applied gains can change with these data. A change of orientation or geographic position of the spectator leads to a modification of the value of the gains applied to the various spatialized single-channel audio streams. The modification of the value of the applied gains is done in real time.

According to the second implementation variant in which the class of the audio streams is considered, the description table TAB is read in order to determine what class is associated with what spatialized single-channel audio stream $F_{spatia}1$-$F_{spatia}N$. A respective gain is applied to the spatialized single-channel audio streams $F_{spatia}1$-$F_{spatia}N$, whose class corresponds to that chosen by the spectator. The spectator can at any moment modify their preference instructions such that different gains are applied. The respective gain values are modified in real time.

At step E11, the spatialized single-channel audio streams $F_{spatia}1$-$F_{spatia}N$ are sent to an audio headset or personal speaker type broadcast module. The spectator can then take advantage of the auditory immersion provided by the system according to the invention.

According to an implementation variant, integrating information about the progress of the sporting event into the audio streams broadcast to the spectators is also intended. According to this variant, the server SERV may further comprise a library BIB comprising a plurality of informative audio streams $F_{info}1$-$F_{info}N$ each associated with one phase of play. The informative audio streams $F_{info}1$-$F_{info}N$ can be automatically broadcast to the spectator. The type of the phase of play in progress is determined among a plurality of types of phases of play. The types of phases of play comprise for example goal, penalty, foul, etc. According to the type of phase of play determined, at least one informative audio stream $F_{info}1$-$F_{info}N$ is selected in the library BIB in order for the sound playback thereof. The informative audio streams $F_{info}1$-$F_{info}N$ can be automatically broadcast to the spectator.

As a variant, the informative audio streams $F_{info}1$-$F_{info}N$ are only broadcast if the spectator chooses it. The informative audio streams $F_{info}1$-$F_{info}N$ in particular allow adding auditory information on what the spectator is seeing. For example, in a goal phase, the broadcast auditory audio stream indicates to the spectator that there was a goal. In this way, the immersion of the spectator in the sporting event which they are attending can be further increased. In this way, they also won't miss any important phase of play.

According to an example, the determination of the type of the phase of play underway is done by means of a capture device DC comprising at least one video camera, such as shown in FIG. 3. The capture device DC is disposed so as to be able to follow all phases of the sporting event. The images captured by the capture device can be sent to the computerized analysis module which is able to determine, in real time, a type of the phase of play that the capture device DC is currently getting. The types of game phases can be determined by means of a deep neural network learning method.

The invention claimed is:

1. A method for broadcasting a multichannel audio stream to terminals of spectators attending a sports event,
where the method comprises:
  acquisition of a plurality of raw audio streams constituting a soundscape comprising one or more sound sources by a plurality of audio sensors distributed over a space hosting the sports event;
  analysis, by a server, of the soundscape comprising:
    isolation of each sound source of the soundscape and assignment of a single-channel audio stream, specific to each sound source;
    for each single-channel audio stream, a spatial localization as a function of a position of the sound source associated with a single-channel audio stream, in the space hosting the sporting event,
    generation of a description table of the single-channel audio streams, where the description table comprises an identifier of each single-channel audio stream and, in association with each single-channel audio stream identifier, at least one localization data;
  transmission of the description table with a multichannel audio stream to one or more terminals by the server, where the multichannel audio stream aggregates the single-channel audio streams;
  use of the received description table and of the multichannel audio stream by a terminal for applying a sound spatialization filtering of the single-channel audio stream according to the respective locations of each single-channel audio stream on the one hand and on the position of the spectator in said space hosting the sporting event on the other hand, in order to playback spatialized sound of at least one part of the single-channel audio streams on the terminal,
  further comprising, in the server:
    for each phase of play, a determination of a type of the phase of play, among a plurality of types of phases of play;
    a selection, in a library of informative audio streams, of at least one informative audio stream based on the determined type of the phase of play; and
    a transmission to the terminal of the informative audio stream in order for the sound playback thereof,
  wherein the determination of the type of phase of play is done by machine learning from images acquired by video capture of phases of play by at least one camera, where the learning is done by a deep neural network technique.

2. The method according to claim 1, wherein the analysis of the soundscape further comprises:
  for each single-channel audio stream, a classification of the sound source associated with a single-channel audio stream into one class among a plurality of classes, as a function of a type;
the table further comprising single-channel audio stream class data associated with each single-channel audio stream identifier;
and the method comprising, in the terminal:
  reading from the description table for identifying the class of each single-channel audio stream;
  application of respective gains to the single-channel audio streams for the spatialized sound playback, where the gains are chosen by a spectator with the terminal according to the class of each single-channel audio stream.

3. The method according to claim 1, comprising a determination of an orientation of the spectator relative to a chosen reference frame,
  where the method further comprises an application of respective gains to the spatialized single-channel audio streams, where the respective gains applied to the spatialized single-channel audio streams change as a function of the position and/or orientation of the spectator relative to the chosen reference frame.

4. The method according to claim 1, comprising a division of the space hosting the sporting event into a plurality of sub spaces, where at least one audio sensor is provided in each subspace,
  where the method comprises the construction of the soundscape by a mixing of the raw streams captured by the audio sensors; and
  where the method comprises, for the analysis of the soundscape, a determination of the positions of the sound sources relative to each of said subspaces.

5. The method according to claim 1, wherein the isolation of sound sources is done by separation of sources.

6. The method according to claim 1, wherein the isolation of sound sources is done by temporal-frequency masking.

7. The method according to claim 2, wherein the classification of the single-channel audio streams is done by machine learning, where the single-channel audio streams are classified by a deep neural network technique.

8. A system for broadcasting a multichannel audio stream to terminals of spectators attending a sports event comprising:
  an acquisition module, comprising a plurality of raw audio streams constituting a soundscape comprising one or more sound sources by a plurality of audio sensors distributed over a space hosting the sports event;
  a server comprising a computerized module for analysis of the soundscape configured for:
    isolating each sound source of the soundscape and assigning a single-channel audio stream to each sound source;
    for each single-channel audio stream localizing the sound source associated with a single-channel audio stream, in the space hosting the sporting event;
    generating a description table of the single-channel audio streams, where the description table comprises an identifier of each single-channel audio stream and, in association with each single-channel audio stream identifier, at least one localization data;
  a transmission module configured for transmitting the description table with a multichannel audio stream to one or more terminals, where the multichannel audio stream aggregates the single-channel audio streams;

a terminal configured for:

using the received description table and of the multichannel audio stream for applying a sound spatialization filtering of the single-channel audio stream according to the respective locations of each single-channel audio stream on the one hand and on the position of the spectator in said space hosting the sporting event on the other hand, in order to playback spatialized sound of at least one part of the single-channel audio streams on the terminal, wherein the server is configured to:

for each phase of play, determining of a type of the phase of play, among a plurality of types of phases of play;

selecting, in a library of informative audio streams, of at least one informative audio stream based on the determined type of the phase of play; and transmitting to the terminal of the informative audio stream in order for the sound playback thereof, wherein the determination of the type of phase of play is done by machine learning from images acquired by video capture of phases of play by at least one camera, where the learning is done by a deep neural network technique.

9. The system according to claim 8, wherein an orientation sensor is able to determine the orientation of the spectator in space, where the orientation sensor is chosen among an inertial navigation unit and/or an accelerometer.

* * * * *